(12) United States Patent
Kopardekar et al.

(10) Patent No.: US 11,780,612 B1
(45) Date of Patent: Oct. 10, 2023

(54) SPACE TRAFFIC MANAGEMENT SYSTEM ARCHITECTURE

(71) Applicant: United States of America as Represented by the Administrator of NASA, Washington, DC (US)

(72) Inventors: Parimal Hemchandra Kopardekar, Cupertino, CA (US); Sreeja Nag, Redwood City, CA (US); David Daisuke Murakami, Sunnyvale, CA (US)

(73) Assignee: United States of America Administrator of NASA, Washington, DC (US)

( * ) Notice: Subject to any disclaimer, the term of this patent is extended or adjusted under 35 U.S.C. 154(b) by 278 days.

(21) Appl. No.: 17/030,273

(22) Filed: Sep. 23, 2020

Related U.S. Application Data

(60) Provisional application No. 62/904,599, filed on Sep. 23, 2019.

(51) Int. Cl.
- *B64G 1/24* (2006.01)
- *H04W 4/46* (2018.01)
- *B64G 1/46* (2006.01)
- *B64G 1/14* (2006.01)

(52) U.S. Cl.
CPC .............. *B64G 1/24* (2013.01); *B64G 1/14* (2013.01); *B64G 1/46* (2013.01); *H04W 4/46* (2018.02)

(58) Field of Classification Search
CPC .. B64G 1/24; B64G 1/14; B64G 1/46; H04W 4/46
See application file for complete search history.

(56) References Cited

U.S. PATENT DOCUMENTS

| | | | | |
|---|---|---|---|---|
| 10,320,471 | B1* | 6/2019 | Panthi | H04B 7/18513 |
| 2001/0002914 | A1* | 6/2001 | Aramoto | G06F 8/65 |
| | | | | 370/220 |
| 2014/0045420 | A1* | 2/2014 | Tong | H04B 7/18506 |
| | | | | 455/12.1 |
| 2015/0134295 | A1* | 5/2015 | Kim | B64G 99/00 |
| | | | | 702/152 |
| 2019/0050485 | A1* | 2/2019 | Wiegand | G06F 16/9038 |
| 2019/0379597 | A1* | 12/2019 | Kolding | H04W 28/065 |
| 2021/0078735 | A1* | 3/2021 | Kapp | G06N 3/0454 |

FOREIGN PATENT DOCUMENTS

CN 104049263 A * 9/2014 ............. G01S 19/33

* cited by examiner

*Primary Examiner* — Behrang Badii
*Assistant Examiner* — Jay Khandpur
(74) *Attorney, Agent, or Firm* — Rhys W. Cheung; Robert M. Padilla; Trenton J. Roche

(57) ABSTRACT

A Space Traffic Management (STM) system comprising a Space Traffic Management System Service Supplier (S3) interface for sending a space conjunction request to a Conjunction Assessment Supplier (CAS) interface, and a Space Situational Awareness Supplier (SSA) interface for receiving and fulfilling space object data requests. The system further comprising the Conjunction Assessment Supplier (CAS) interface for receiving the space conjunction request from the S3 interface, requesting and receiving the space object data from the SSA interface, and generating and sending a conjunction data message to the S3 interface. The system enables coordination of an automated service for spacecraft owner operators to anticipate and avoid a space traffic conjunction using the conjunction data message.

20 Claims, 7 Drawing Sheets

SPACE TRAFFIC MANAGEMENT SYSTEM ARCHITECTURE

RELATED APPLICATION

The present application claims priority to U.S. Provisional Application 62/904,599, filed on Sep. 23, 2019, and incorporates that application by reference in its entirety.

ORIGIN OF INVENTION

The invention described herein was made in the performance of work under a NASA contract and by (an) employee(s) of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor has elected not to retain title.

FIELD

The present invention relates to space traffic, and more particularly to space traffic management.

BACKGROUND

Space is becoming increasingly congested as the number of on-orbit satellites and debris objects continues to grow.

Currently NASA manually manages a space object database and coordinates ad hoc with various satellite owner/operators or foreign government agencies if it appears a conjunction is likely. Public satellites are manually managed by their owners within the United States and internationally.

However, this system is entirely manual, difficult to coordinate, and does not scale. Scaling becomes a major concern as the number of man-made objects dramatically increases in space through developments such as launch ride sharing, large scale satellite constellation deployments and the growth in availability of small launch vehicles.

Furthermore, the enactment of Space Policy Directive 3 which moves Space Situational Awareness responsibilities away from the Department of Defense and to a civil agency will require that a system be established to implement that directive.

SUMMARY

As ever larger numbers of spacecraft seek to make use of Earth's limited orbital volume in increasingly dense orbital regimes, greater coordination becomes necessary to ensure these spacecraft are able to operate safely while avoiding physical collisions, radio-frequency interference, and other hazards. While efforts to date have focused on improving space situational awareness (SSA) and enabling operator to operator coordination, there is growing recognition that a broader system for space traffic management (STM) is necessary.

The space traffic management (STM) system is designed to ensure safety of flight in an increasingly congested space environment, while meeting objectives associated with the transition of civilian STM from the Department of Defense to a civilian entity. It provides a robust framework for the necessary interfaces between key STM stakeholders.

This architecture forms the framework for an STM ecosystem, which enables the addition of third parties that can identify and fill niches by providing new, useful services. By making the STM functions available as services, the architecture reduces the amount of expertise that must be available internally within a particular organization, thereby reducing the barriers to operating in space and providing participants with the information necessary to behave responsibly. Operational support for collision avoidance, separation, etc., is managed through a decentralized architecture, rather than via a single centralized government-administered system.

The STM system is based on the use of standardized application programming interfaces (API) to allow easier interconnection and conceptual definition of roles to more easily allow suppliers with different capabilities to add value to the ecosystem. The architecture handles basic functions including registration, discovery, authentication of participants, and auditable tracking of data provenance and integrity.

In one embodiment, the system utilizes an open-access architecture, enabling any interested entity to join the system and be discoverable as a new participant in the system.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

An architecture to enable efficient data sharing and coordination between participants facilitating safe spaceflight operations is described. Such an architecture enables and promotes the emerging field of commercial Space Traffic Management (STM) services, and may replace or operate as a complement to existing government-provided services.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
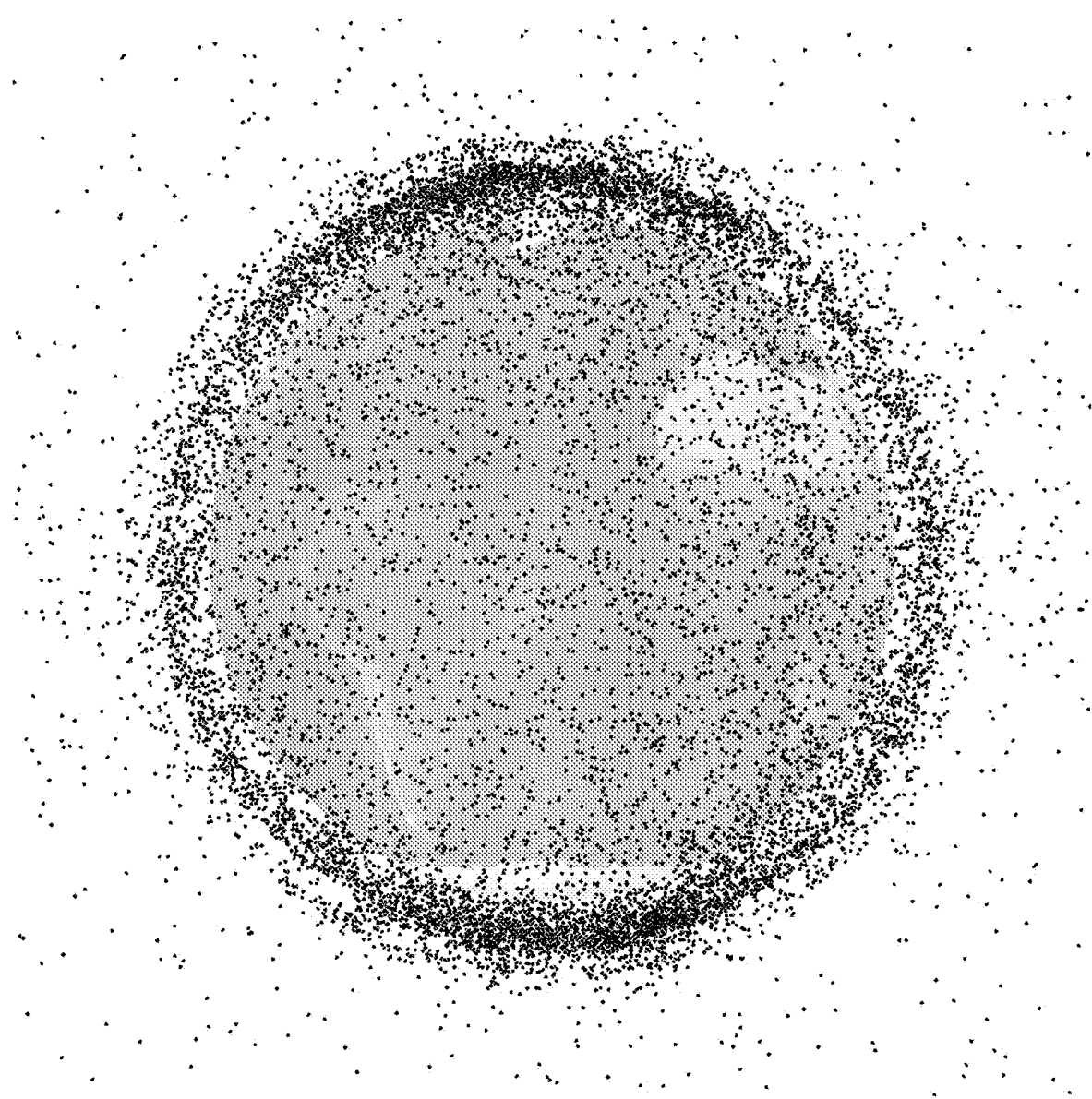
FIG. 1 is an illustration of the distribution of objects that an orbital satellite might encounter, potentially obstructing safe operation.

Today there are 3,200 active satellites and 21,400 tracked objects in low earth orbit. These numbers have been increasing rapidly, and are already impacting space operations. Uncontrolled growth of congestion in orbit will severely affect future space operations. FIG. 1 illustrates the current prevalence of tracked objects, including satellites, space craft, space debris, and other tracked objects. Note that the size of the objects in the figure are not to scale. As the number of such objects increases, the need for Space Traffic Management Services (STM) increases as well. The present system provides a way to provide safe operations with cooperative management, and a diverse set of participants. By providing standardized roles, an open architecture, and application programming interfaces (APIs) to interface between the participants, the system is designed to grow as the number and variety of participants grows. This architecture also reduces the STM burden for small owner/operators, and makes it easy to be a good citizen.

The system may simply provide an open interface, registration, and data validation, with more complex processes being handled by other entities, with human intervention. Over time, the system may incorporate autonomous maneuver planning and deconfliction, as well as addressing radiofrequency interference, space weather, and other aspects of resolution. In one embodiment, the system may also provide an interface for active debris removal, rendezvous, and proximity operations. Because the architecture is an open architecture with flexibility for additional participants, additional roles and entities may join the system. Thus, while the below exemplary set of participants may be present in the system, some or all of them may be replaced by other entities.

Figure 2:
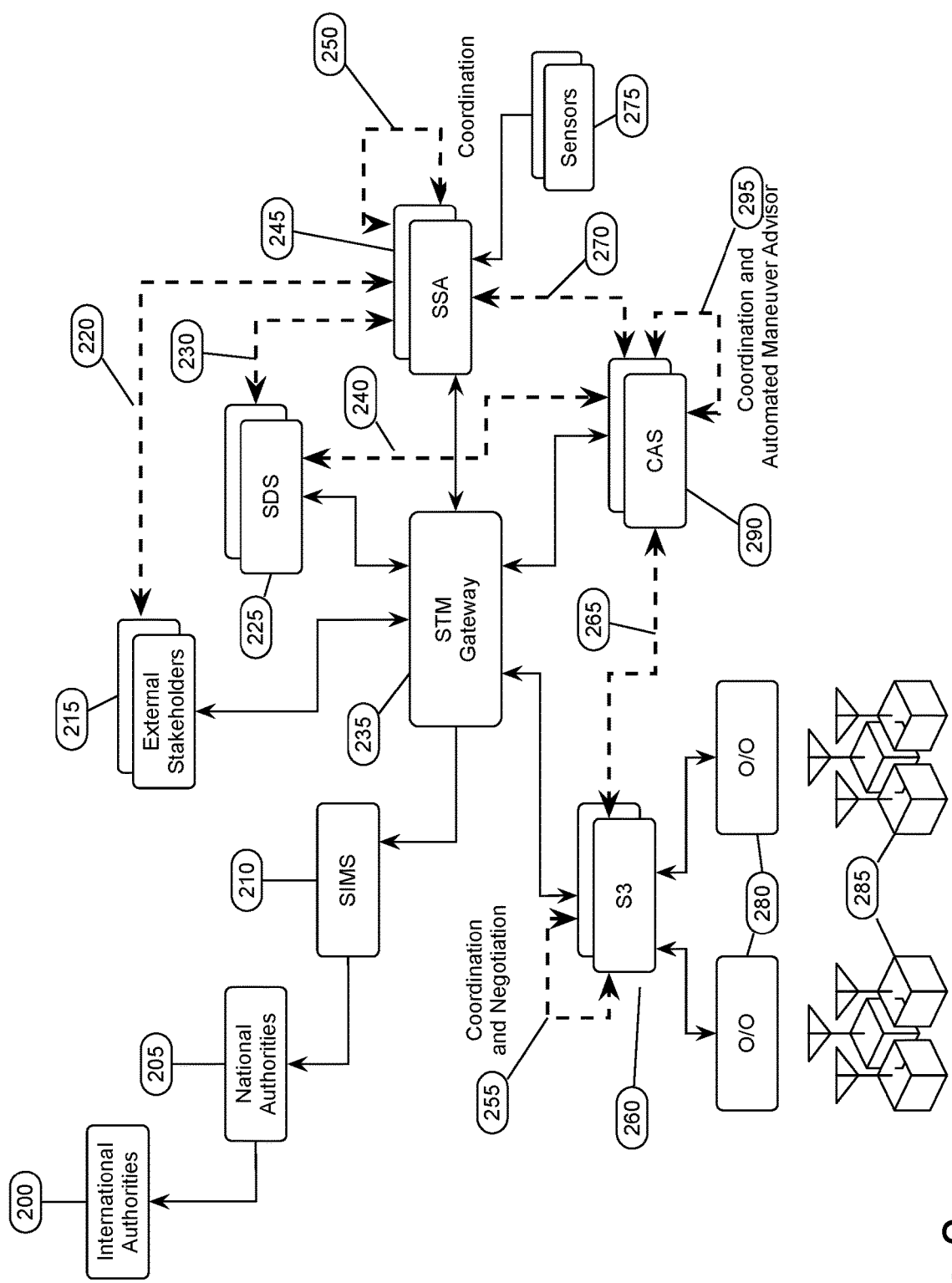
FIG. 2 illustrates one embodiment of the relationships between the suppliers and users of the system and how they would seek to exchange information.

FIG. 2 illustrates one embodiment of core architecture of the system. In one embodiment, the various entities that have defined roles in the system interact with the system via a system interface for that role. In one embodiment, each role has a set of capabilities they meet to fulfill requests from other roles in the system. Each supplier role may accommodate multiple entities offering that service. The system also accommodates a single business or legal entity that wishes to fulfil more than one role. For instance, sophisticated owner/operators may serve as their own space services suppliers (S3), and firms operating as space situational awareness (SSA) suppliers may also provide collision assessment (CAS) services. In one embodiment, a standard interface and a common application programming interface (API) structure permits easy communication between the entities/roles, with each entity making its own decisions about which suppliers to use. In one embodiment, an entity may choose to augment the standard set of interfaces with new features specific to its own use cases.

The Owner/Operator (O/O) 280 is the beneficiary of the system. Owner/Operators 280 are the companies, government entities, or persons that control satellites, space stations, rockets, or other intentional objects in space. In one embodiment, the Owner/Operators 280 are not direct participants in the system, but rather interact with the system through a Space Traffic Management Service Supplier (S3). The spacecraft 285 are under the control of the O/O and are the subject of the system. In this context, the term "spacecraft" encompasses intentional objects in space, whether controllable by the O/O or not. Other objects in space which may be relevant are referred to as resident space objects (RSOs) which encompass spacecraft, space debris, and other objects which are tracked in space.

The Space Traffic Management (STM) Service Supplier (S3) serves as a link between the O/O and the wider STM system (including other S3s). The S3 serves as a controller, in a relationship analogous to that between an air traffic controller and a pilot. The pilot (O/O) has direct control and ultimate responsibility for the aircraft, but exchanges information with and cooperates with the controller (S3). The controller has the big picture understanding through access to a wider network of data sources and tools, and uses them to generate directives that perform deconfliction. In this architecture, the S3 260 is a software system that communicates through a standardized API interface. The S3 may generate instructions algorithmically and/or with human help.

The S3 260 provides information regarding possible conjunctions between objects in space, and calculations for potential maneuvers. In one embodiment, the S3 260 may also assist in negotiations between O/Os 280 for cost management of maneuvers. In one embodiment, the S3 260 may also advise O/Os 280 of adverse conditions that may affect the spacecraft. In one embodiment, the S3 260 may provide other services. FIG. 2 illustrates exemplary communications between the S3 260, and other entities such as CAS 290. The communications shown by dashed line between the various entities, in one embodiment, are passed through the STM gateway 235. In one embodiment, this is true of all communications indicated via dashed lines.

The S3 260 may utilize the system to communicate with other S3 via connection 255 to coordinate and negotiate maneuvers. This facilitates automated communications between O/Os 280 to enable robust resolutions to potential conjunctions, interference, or other conflicts as well as arriving at least cost solutions to these problems.

The Conjunction Assessment Supplier (CAS) 290 uses information from supplemental data suppliers (SSAs) and S3s 260 to identify potential conjunctions, which are instances where two or more resident space objects (RSOs) approach within a hazardous distance of each other. When an active satellite moves to avoid a potential conjunction, it is acting to mitigate three potential sets of conjunctions: the primary conjunction that motivates the maneuver, any secondary conjunctions between the maneuvering satellite and the object included in the initial conjunction, and any tertiary conjunctions between the maneuvering satellite and other RSOs. The CAS 290 calculates all three types of potential conjunctions.

After initial conjunction identification, a CAS 290 generates a conjunction data message, identifying the potential conjunctions, and provides that report to the S3, and through the S3 to the O/O. p The CAS 290 may further be involved in subsequent steps depending on the S3 260 and preferences of both suppliers. In one embodiment, if an S3 260 requests CAS 290 involvement in conjunction assessment, the S3 260 and CAS 290 work jointly to identify which conjunctions might require collision avoidance maneuvers and which could be cleared with further analysis. In cases where there is insufficient information to rule out a potential conjunction, a CAS 290 or S3 260 may request as part of communication 270 additional observations from an SSA to reduce uncertainty in the trajectory of a tracked object. The decision to maneuver to avoid a collision is not taken lightly, since it may significantly disrupt operations and may reduce the operational lifetime of the spacecraft. When a collision avoidance maneuver is determined to be necessary, either the S3 260 or the CAS 290 would generate a proposed maneuver and screen it against known SSA information. Even for spacecraft without propulsion, potential action can be taken with sufficient warning to enter a high drag configuration to alter orbital phasing or to change attitude to minimize collision cross-section.

The CAS 280 in one embodiment provides the computational analyses to determine potential conjunctions, calculate maneuvers to maintain orbit, validate potential maneuvers to avoid causing additional conjunctions, and perform other orbital calculations that may need to be performed.

In one embodiment, the CAS 290 may communicate with other CAS via connection 295 to coordinate maneuvers when more than one spacecraft may be maneuvering as well as provide an automated maneuver advisor service. In one embodiment, the S3 260 sends a requests to the CAS 265 for conjunction analysis, conjunction avoidance, and/or maneuver planning.

The Space Situational Awareness (SSA) supplier 245 acquire and pool observations from sensors 275 and/or owner/operators to generate and collect catalogs of information relating to the space environment, primarily position and trajectory information for resident space objects (both active satellites and debris). The sensors that feed SSA suppliers 245, in one embodiment, are a mixture of those operated by SSA suppliers themselves and others run by third parties who share information the SSA suppliers on a commercial, free, or reciprocal basis. These third parties may include other commercial or government entities, academic institutions (e.g. astronomical telescopes), or potentially crowdsourced (and appropriately curated) space enthusiast observations. The SSA 245 provides as part of communication 270 ephemeris data of resident space objects (RSOs) in orbital space to the CAS 265.

The SSA 245 catalog data provided to the STM system may have various permutations. The SSA 245 may include a (1) single authoritative catalog (similar to U.S. air traffic control), (2) a small number of high quality catalogs (with a number small enough for CAS providers, S3s, and O/Os to manually or semi-manually decide to use a particular catalog and incorporate it into their workflow), (3) a large number of catalogs (where verification and validation would need to be automated or mostly-automated), or (4) a small or large set of catalogs combined with algorithms to develop a single decentralized consensus. In one embodiment, multiparty computation (MPC) provides a mechanism to securely share inputs from various SSAs 245 through coordination 250, for computations in a way that shields the inputs from other parties, while publicly disclosing and confirming the result of a computation. MPC may be used as a technique for generating a meta-catalog.

One embodiment of the system would include an interface for one or more Supplemental Data Suppliers (SDS) 225. These suppliers 225 in one embodiment offer space weather data, information regarding micro-meteoroid showers, and/or data about other hazards present in orbital space. Data may be made available either in response to a request by a CAS 290 to SDS 225 via connection 240 or as an alert regarding adverse events to one or more SSA providers 230.

For example, space weather affects low earth orbits via its effects on atmosphere, space weather has the potential to temporarily degrade communications between satellites or between satellites and the ground. There are also temporary or permanent mechanisms by which space weather can damage spacecraft electrical components. Space weather events are temporary changes in the environment which may disrupt communications or damage spacecraft.

An SDS 225 may act as a space weather supplier, to help prevent damage to spacecraft by predicting space weather events where feasible and allowing the S3 260 and/or CAS 290 and/or Owner/Operators 280 to utilize that data to take preparatory actions such as reorienting spacecraft or entering safe mode. Another type of SDS 225 may be one that tracks micrometeoroid flux, which could help inform shielding requirements in various orbital regions or warn suppliers of unexpected increases in micrometeoroid populations.

In one embodiment a Space Information Management System (SIMS) 210 interface enables government authorities to query other entities for data, which they can use to set space policy and oversight. The SIMS 210 in one embodiment relays data retrieved for use by national authorities 205, who then may pass the data on to international treaty organizations 200. In one embodiment, the spaceflight information system serves as a standardized interface into the system for U.S. and other government regulatory entities. In one embodiment, the system may enable such government entities to require certain regulatory performance or licensing requirements of the service suppliers. If so, the STM gateway 235 may support this feature.

In one embodiment external stakeholders 215 have an interface into the system, permitting limited participation by outside organizations. These organizations may be academic astronomy or space researchers, amateur astronomers, or other non-governmental organizations. In one embodiment, the relationship of external stakeholders 215 to the system is ad hoc and the data they provide may require verification. In one embodiment, the stakeholders 215 include amateur astronomers participating in a volunteer effort to track near earth objects. In one embodiment, an organization becomes more active and reliable participants over time and choose to provide services within the system by adopting an additional role and communicating via the corresponding interface. In one embodiment these stakeholders 215 query an SSA 245 via connection 220 for information regarding known objects in an area of space 215. In one embodiment the external stakeholder 215 provide independent observations to augment the data collected by the SSA supplier 245, SDS 225, or other data available in the system.

The STM gateway 235 performs the role of authentication and logging for all participants in the system. In one embodiment, requests from each participant in the system are relayed to the intended recipient via this gateway, and responses are received via the gateway. The gateway 235 itself, in one embodiment, does not provide any data other than record keeping and maintaining system integrity. The STM Gateway remains transparent to the end suppliers participating in the system insofar as each message has proper integrity and is directed at a proper recipient within the system.

In one embodiment, the STM gateway 235 provides a centralized registry of participating entities or provides a decentralized discovery technique. Authentication ensures that entities are able to securely demonstrate their own identity, as well as validate the identity of other system participants. Authentication is particularly important given the sensitivity of the information exchanged across the system and the high level of trust in an S3 necessary for an O/O. In one embodiment, the STM gateway 235 also establishes auditable records of data provenance for accountability, particularly as data is transformed from raw observations into SSA products or used as a basis for maneuver decisions. Data accuracy, and data use tracking may also be provided. In one embodiment, the data use tracking may be used by upstream suppliers to negotiate payment strategies that monetize all downstream uses of their data. Data integrity verification is used to protect against malicious actors or simple errors during transmission, both of which could have profound and expensive consequences if a reliance on erroneous data leads to a breakdown in the STM system that results in a collision.

The system is diagrammed showing one entity per role and one role per entity. In one embodiment, an entity may take on multiple roles. In one embodiment, a CAS 290 supplier could take on the role of SSA 245 supplier. Another embodiment may involve an SSA 245 supplier who additionally provides weather reports so the supplier has an additional SDS 225 interface.

Figure 3:
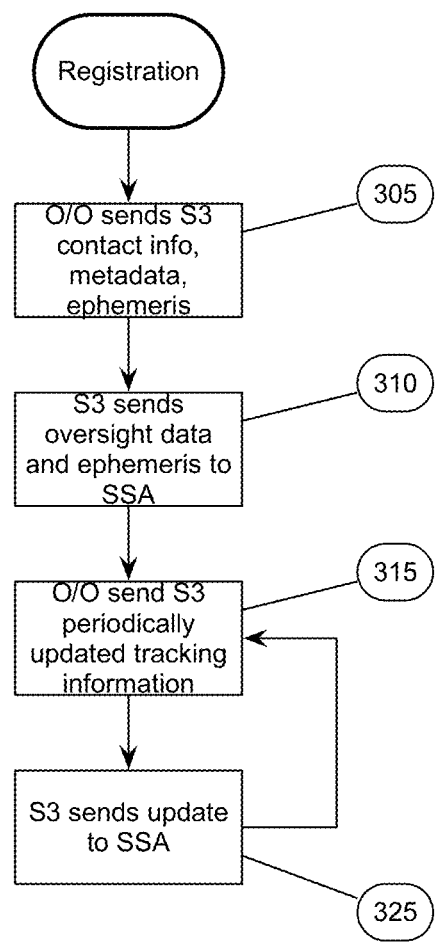
FIG. 3 is a flowchart of one embodiment of registration to enroll a new owner/operator or satellite into the system.
Figure 4:
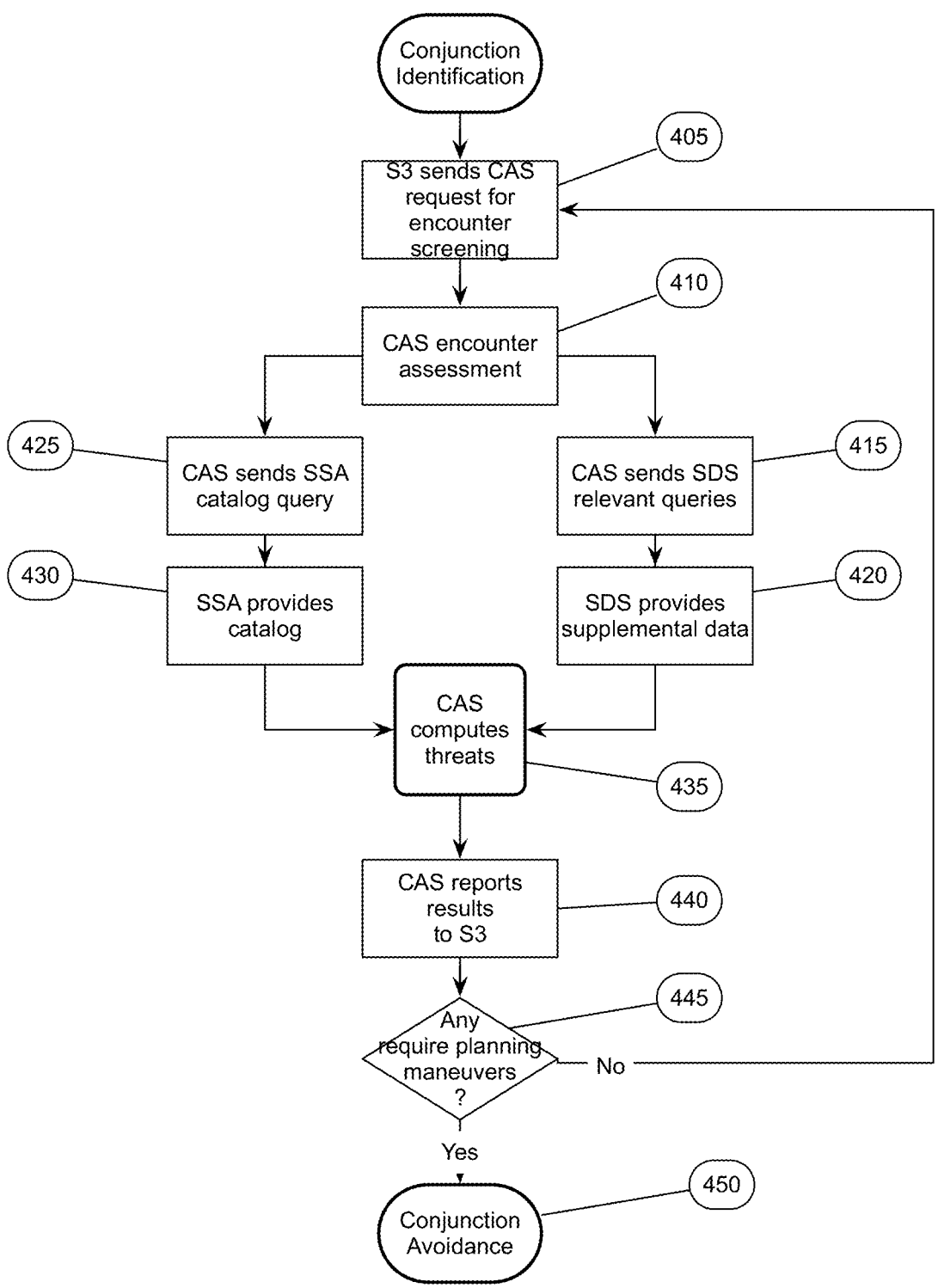
FIG. 4 is a flowchart of one embodiment of determining whether an orbital conjunction is likely.
Figure 5:
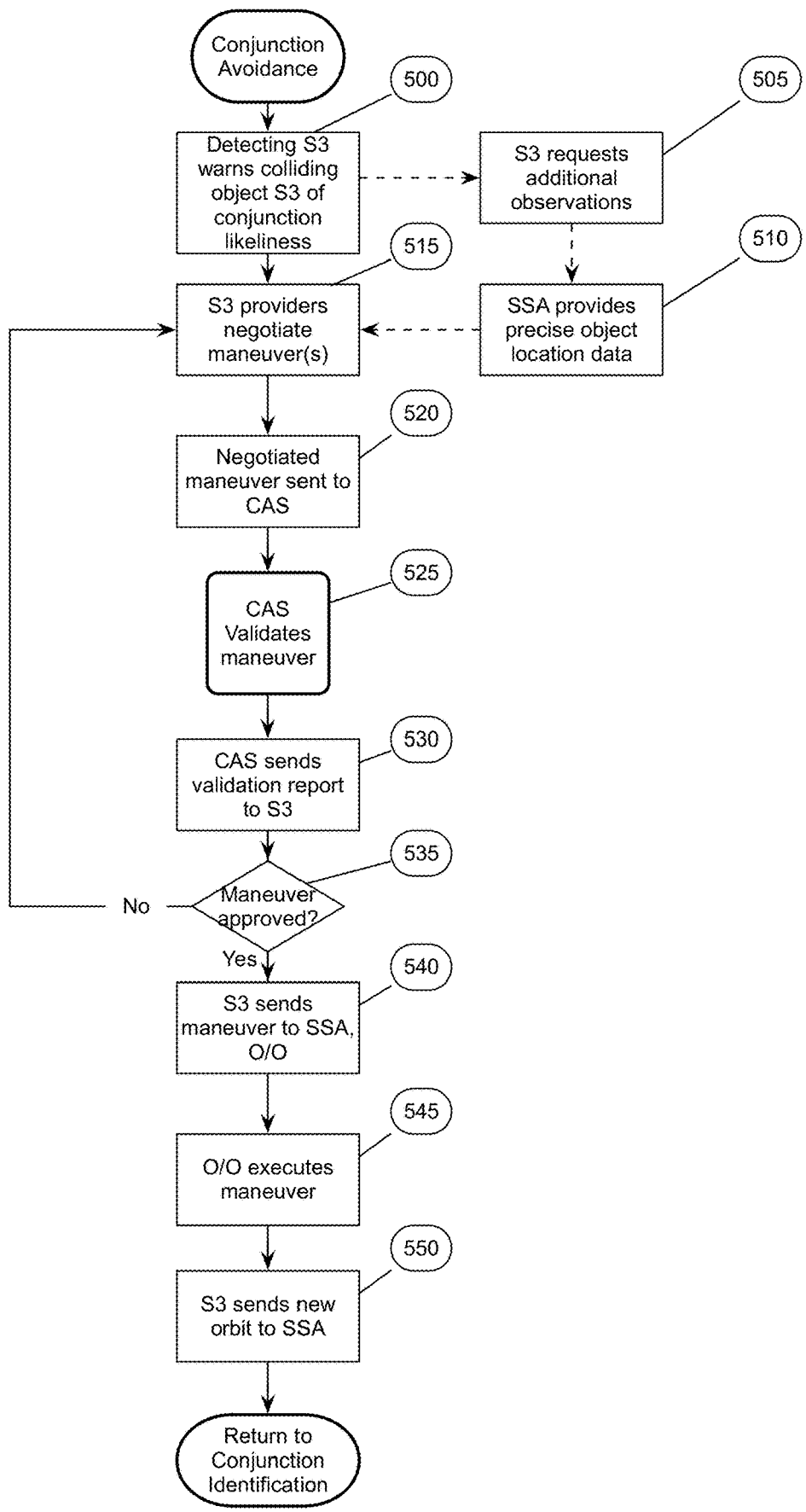
FIG. 5 is a flowchart of one embodiment of conjunction avoidance planning.

The communication system processes illustrated in FIGS. 3-5 shows how the system may be employed and how suppliers fulfilling those roles would exchange information.

FIG. 3 is a flowchart of one embodiment of the process by which the O/O enrolls their spacecraft to utilize the system avoid collisions.

The owner operator establishes a relationship with a S3 service by legal or technical means. The S3 service collects data from the O/O required for participation in the system 305 including owner registration details and ephemeris, at block 305.

The S3 service would then represent the spacecraft within the system. To complete enrollment, the service would send the oversight data and ephemeris via the S3 interface to an SSA supplier, at block 310. An SSA supplier receives the data on the spacecraft from the S3 service via the SSA interface.

Over time, spacecraft trajectory drift causes the actual trajectory to differ from the numerically propagated estimates, because orbits are not static. To keep the participants of the system informed, periodically the O/O relays updates of the spacecraft's ephemeris to the S3 periodically, at block 315. The S3 in turn transmits all updates via the S3 interface to the SSA interface for their respective supplier, at block 325. This loop continues until such time as the spacecraft is removed from orbit, or is deregistered from the S3.

Once a spacecraft is registered and throughout the course of its operation, the O/O must be alert to potential hazards along the path of the spacecraft's flight. As individual orbits become more crowded, the risk of a conjunction increases exponentially.

FIG. 4 is a flowchart of one embodiment of the flow of data through the system to determine whether an orbital conjunction is likely.

In one embodiment, the first step is for the S3 for an O/O to send a request to a CAS for encounter screening for a volume space surrounding the spacecraft in question for a specified time. In one embodiment, this time is for up to and including 7 days after the time of the request. In one embodiment this request is made at a pre-determined frequency, or on an as-necessary basis. In one embodiment, the periodic frequency is every 30 minutes. The request in one embodiment specifies the O/O's unique ID and properties. In one embodiment, the S3 selects the CAS for this request using a registry, via the API.

When the CAS receives the request at block 410, via the CAS API, they initiate an encounter assessment.

In one embodiment, the CAS sends an SSA service a catalog query, at block 425, to identify the list of objects in the region of space and time in question. At block 430, the SSA provides the requested catalog of objects anticipated to be in that space at the requested time.

In one embodiment, the CAS concurrently with the SSA query, sends a request to an SDS, at block 415, for relevant space condition and/or event data. At block 420, the SDS returns supplemental data relevant to the space and time and any other significant operational parameters of the spacecraft. In one embodiment the SDS returns data on solar flares anticipated to affect radio communications in that region of space at that time.

In one embodiment at block 435, the CAS uses the data queries made to calculate potential conjunctions. In one embodiment, this may be done using open source and/or proprietary conjunction algorithms. At block 440, the CAS reports these results to the S3. In one embodiment, the CAS returns these results via the API. In one embodiment, the S3 may identify any High Interest Events (HIE) from the conjunction data messages. In one embodiment, if such a high interest event warrants more analysis, the S3 may resubmit the data to the CAS, requesting it to rerun with more accurate SSA sources. The S3 may also resubmit the data closer to the time of the HIE, to see how the event changes over time.

The S3 determines whether any of the HIEs should have potential avoidance maneuvers planned. In one embodiment, the S3 may automatically select the HIEs that have a relatively high probability of conjunction and are sufficiently near in time. In one embodiment, manual selection may be made. If any of the HIEs are selected for maneuver planning, as determined at block 445, the data associated with the HIE is sent to the CAS for conjunction avoidance calculations, at block 450. Otherwise, the process returns to block 405 to await the next encounter screening.

Once a potential conjunction has been identified, corrective action must be taken to avoid risk to the spacecraft.

FIG. 5 is a flowchart of one embodiment of conjunction avoidance planning.

If an event is identified as a potential conjunction which involves a one or more additional spacecraft participating in the system, the S3 notifies the O/O's of the spacecraft impacted, at block 500. In one embodiment, the S3 notifies the O/O via the S3 that represents the O/O. In one embodiment if a spacecraft is identified as participating in the system, the system enables negotiation between the O/Os via their respective S3s, at block 515. In one embodiment, the S3s negotiate based on prescribed algorithms for least cost maneuvering.

Once the initial notification is sent, in one embodiment the S3 may request additional observations from an SSA provider, at block 505, if the data employed for the initial assessment is imprecise or not up to date. Once requested, the SSA provider sends ephemeris data relating to the objects of interest, at block 510. In one embodiment, this data is provided to the CAS system to update the conjunction calculations. If the updated data indicates that there is no need for maneuver planning, the system may abort. Otherwise, the process continues to block 515.

Once the data on the objects relating to the conjunction is sufficiently detailed to plan maneuvers, in one embodiment, an Automated Maneuver Advisor (AMA) calculates maneuvers to avoid the conjunction. The AMA in one embodiment is part of the CAS.

In one embodiment the S3 requests the CAS to plan maneuvers for negotiation which the S3 receives and presents for negotiation at block 515. In one embodiment, when only one maneuverable spacecraft is involved in the event, this may be skipped. In one embodiment, the O/Os, via their respective S3 providers, may engage in negotiations involving multiple maneuver plans presented as offer and counteroffer.

Once a plan for a maneuver has been negotiated, in one embodiment the negotiated maneuver is sent to the CAS for validation, at block 520. In one embodiment at 525, the CAS validates the maneuver plan for correctness and to ensure that there are no secondary or tertiary conjunctions as a result of the maneuver. At block 530, the CAS sends the validation report to the requesting S3s of the involved O/Os.

At block 535, the process determines whether the maneuver has been validated. If the CAS identified some problem or issue with the proposed maneuver, the S3 returns to 515 for further planning and negotiation. Otherwise, the process continues to block 540.

With an approved maneuver, in one embodiment the S3 sends the approved maneuver plan to the O/Os as well as the SSA for recording at block 540. The O/O then executes the maneuver and reports back on the success at block 545. The new orbit is then sent to the SSA to record at block 550. Once the spacecraft is confirmed in the new orbit, the S3 resumes the regular conjunction check process.

Figure 6:
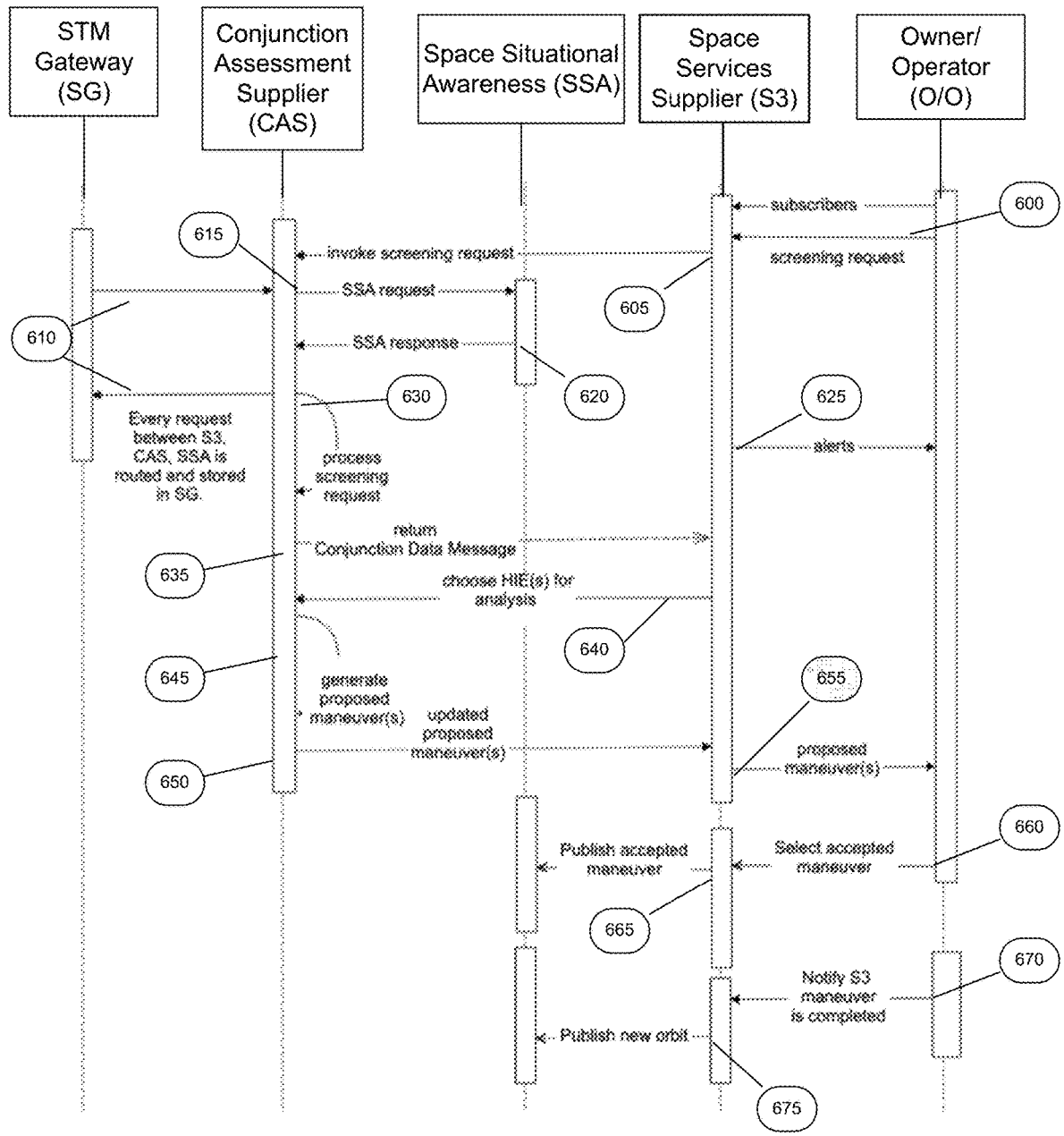
FIG. 6 is an exemplary diagram of message flows through the system among defined interfaces.

Another way of looking at the system in terms of data flow. FIG. 6 is an exemplary diagram of embodiments of the message flow through the system among the defined interfaces. This message flow process occurs after an owner/operator is initially associated with an S3 and joins the system.

A screening request 600 originates with the O/O and is sent to the S3. The S3 forwards the screening request to the CAS, 605. The CAS sends an SSA request to the SSA, message 615, and receives a response with message 620. Loop 630 represents internal processing of the request by the CAS. With message 635, the CAS returns a conjunction data message to the S3.

In one embodiment, the S3 sends alerts 625 to the O/O that are received from elsewhere in the system. For example, alerts may include messages about potential conjunctions with other space craft, space debris, or potential maneuvers by other space craft that may impact the O/O. In one embodiment this happens independently of the other functions of the system and is interrupt-driven—as alerts are received, they are transmitted to the appropriate O/O(s).

In one embodiment, shown in messages 610, the STM gateway (SG) will receive a copy of every request and response between S3, CAS, and SSA for routing and storage. In one embodiment, the STM gateway will send and receive messages 610 between and on behalf of the S3, CAS and SSA and all other participants in the system after authenticating, validating the integrity, and logging each message.

In one embodiment where a High Interest Event (HIE) has been selected by the S3, based on the conjunction data messages from the CAS, the sends a request 640 to a CAS for analysis of that HIE event. The CAS processes that event, shown as loop 645, and sends an updated proposed maneuver to the S3, message 650. The S3 then sends the proposed maneuver on to the O/O for approval, as message 655.

In one embodiment, once a maneuver has been accepted by the O/O, via message 660 to the S3, the O/O sends the planned maneuver to the S3. The S3 reports the intended maneuver to one or more SSA services, via message 665. Once the maneuver has been completed, via message 670, the O/O notifies the S3 of the completion of the maneuver. The S3 publishes the new orbit to one or more SSA services, via message 675. With this publication the process is complete. The SSA has the new ephemeris of the O/O's space craft, and the space craft is in the appropriate location.

This enables the SSA to track the new trajectory of the spacecraft.

In this way, the present application enables a Space Traffic Management system to provide an open platform with a unified API. The STM system, in one embodiment, is based on modern micro-service architecture adhering to OpenAPI standards and deployed in industry standard Docker containers, facilitating easy communication between different participants or services. The system architecture is designed to facilitate adding and replacing services with minimal disruption. The described exemplary participant services (e.g., a space services supplier/S3, space situational awareness provider/SSA, conjunction assessment supplier/CAS, and automated maneuver advisor/AMA) may be replaced and/or augmented with different services to provide similar functional roles within the STM architecture by flexibly connecting to it using pre-defined APIs and data models, thereby lowering the barrier to entry of new players in the STM marketplace.

The present system enables a cohesive and supervised interaction between a disparate set of parties to coordinate and manage the movement of objects in space. This type of space traffic management can manage of the ever-growing numbers of space craft in orbit. Especially as the number of intentional objects and amount of debris in orbit increase, such a coordinating system becomes more and more necessary to ensure safety and continued functioning of our orbital sphere.

Figure 7:
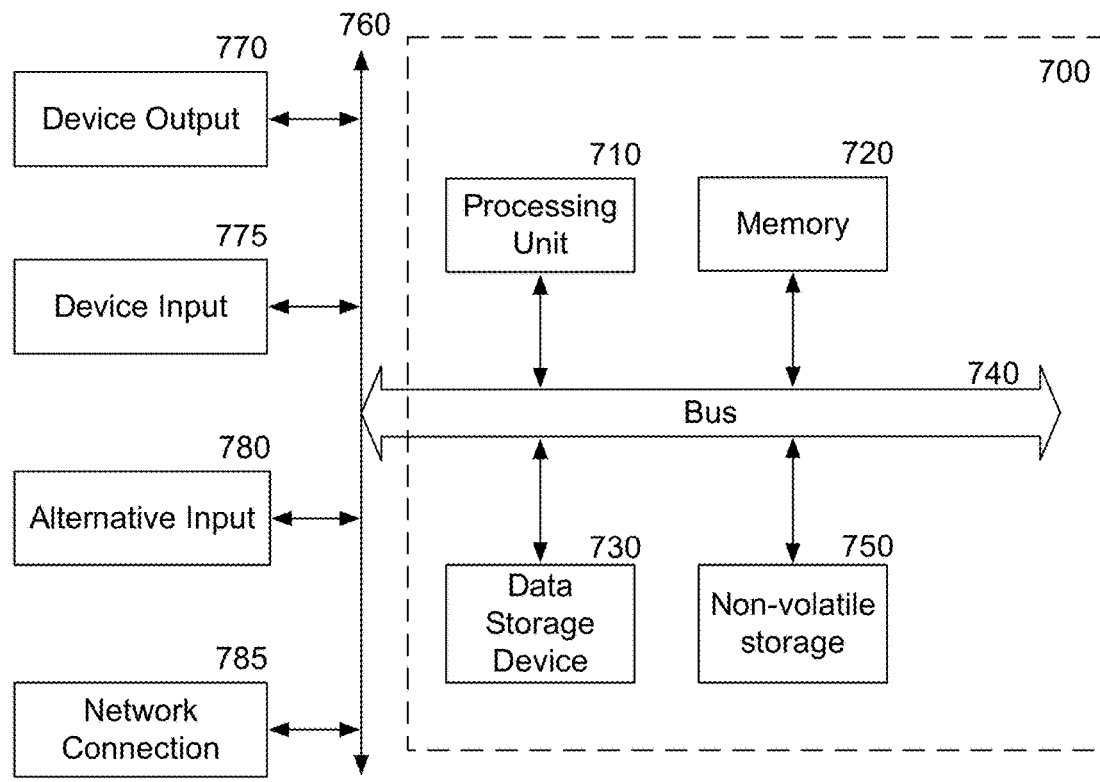
FIG. 7 is a block diagram of one embodiment of a computer system that may be used with the present invention.

FIG. 7 is a block diagram of one embodiment of a computer system that may be used with the present invention. It will be apparent to those of ordinary skill in the art, however that other alternative systems of various system architectures may also be used.

The data processing system illustrated in FIG. 7 includes a bus or other internal communication means 740 for communicating information, and a processing unit 710 coupled to the bus 740 for processing information. The processing unit 710 may be a central processing unit (CPU), a digital signal processor (DSP), or another type of processing unit 710.

The system further includes, in one embodiment, a random access memory (RAM) or other volatile storage device 720 (referred to as memory), coupled to bus 740 for storing information and instructions to be executed by processor 710. Main memory 720 may also be used for storing temporary variables or other intermediate information during execution of instructions by processing unit 710.

The system also comprises in one embodiment a read only memory (ROM) 750 and/or static storage device 750 coupled to bus 740 for storing static information and instructions for processor 710. In one embodiment, the system also includes a data storage device 730 such as a magnetic disk or optical disk and its corresponding disk drive, or Flash memory or other storage which is capable of storing data when no power is supplied to the system. Data storage device 730 in one embodiment is coupled to bus 740 for storing information and instructions.

The system may further be coupled to an output device 770, such as a cathode ray tube (CRT) or a liquid crystal display (LCD) coupled to bus 740 through bus 760 for outputting information. The output device 770 may be a visual output device, an audio output device, and/or tactile output device (e.g. vibrations, etc.)

An input device 775 may be coupled to the bus 760. The input device 775 may be an alphanumeric input device, such as a keyboard including alphanumeric and other keys, for enabling a user to communicate information and command selections to processing unit 710. An additional user input device 780 may further be included. One such user input device 780 is cursor control device 780, such as a mouse, a trackball, stylus, cursor direction keys, or touch screen, may be coupled to bus 740 through bus 760 for communicating direction information and command selections to processing unit 710, and for controlling movement on display device 770.

Another device, which may optionally be coupled to computer system 700, is a network device 785 for accessing other nodes of a distributed system via a network. The communication device 785 may include any of a number of commercially available networking peripheral devices such as those used for coupling to an Ethernet, token ring, Internet, or wide area network, personal area network, wireless network or other method of accessing other devices. The communication device 785 may further be a null-modem connection, or any other mechanism that provides connectivity between the computer system 700 and the outside world.

Note that any or all of the components of this system illustrated in FIG. 7 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 720, mass storage device 730, or other storage medium locally or remotely accessible to processor 710.

It will be apparent to those of ordinary skill in the art that the system, method, and process described herein can be implemented as software stored in main memory 720 or read only memory 750 and executed by processor 710. This control logic or software may also be resident on an article of manufacture comprising a computer readable medium having computer readable program code embodied therein and being readable by the mass storage device 730 and for causing the processor 710 to operate in accordance with the methods and teachings herein.

The present invention may also be embodied in a handheld or portable device containing a subset of the computer hardware components described above. For example, the handheld device may be configured to contain only the bus 740, the processor 710, and memory 750 and/or 720.

The handheld device may be configured to include a set of buttons or input signaling components with which a user may select from a set of available options. These could be considered input device #1 775 or input device #2 780. The handheld device may also be configured to include an output device 770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 710, a data storage device 730, a bus 740, and memory 720, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 785.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 710. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A Space Traffic Management (STM) system comprising:
    a Space Traffic Management System Service Supplier (S3) interface configured for sending a space conjunction request to a Conjunction Assessment Supplier (CAS) interface;
    a Space Situational Awareness Supplier (SSA) interface configured for receiving and fulfilling space object data requests, wherein the SSA interface further includes generating a meta-catalog by multiparty computation (MPC) that securely shares inputs from a plurality of SSA interfaces for performing computations on position and trajectory information of resident space objects while shielding the inputs from one or more other interfaces;
    the Conjunction Assessment Supplier (CAS) interface configured for:
        receiving the space conjunction request from the S3 interface,
        requesting and receiving the space object data from the SSA interface; and
        generating and sending a conjunction data message to the S3 interface;
    wherein the system provides an automated service that uses the conjunction data message for spacecraft owner operators to anticipate and avoid a space traffic conjunction.

2. The system of claim 1, further comprising:
    Supplemental Data Supplier (SDS) Interface to receive space environment data requests, responses, and notifications.

3. The system of claim 2, wherein two or more of the SSA interface, S3 interface, CAS interface, and the SDS interface are combined into a single interface.

4. The system of claim 1, further comprising:
    an STM gateway for relaying and recording messages between the S3, the CAS, and the SDS.

5. The system of claim 1, further comprising:
where one or more objects in a space conjunction are not controlled by an O/O participating in the STM system.

6. The system of claim 1, further comprising:
the S3 further configured to enable negotiations between two spacecraft owner operators.

7. The system of claim 1, further comprising:
Supplemental Data Supplier (SDS) Interface to receive space weather data identifying space weather events.

8. The system of claim 1, wherein two or more of the S3, the SSA, and the CAS functions are performed by a single entity.

9. A Space Traffic Management (STM) system comprising:
a Space Situational Awareness Supplier (SSA) interface configured for receiving and fulfilling space object data requests, wherein the SSA interface further includes generating a meta-catalog by multiparty computation (MPC) that securely shares inputs from a plurality of SSA interfaces for performing computations on position and trajectory information of resident space objects while shielding the inputs from one or more other interfaces;
a Space Traffic Management System Service Supplier (S3) interface configured for sending a conjunction avoidance maneuver request to the Conjunction Assessment Supplier (CAS) interface;
the Conjunction Assessment Supplier (CAS)interface configured for:
receiving the conjunction avoidance maneuver request from the S3 interface,
requesting and receiving the space object data from the SSA interface, and
sending the conjunction avoidance maneuver to the S3 interface;
wherein the system provides an automated service that uses the conjunction avoidance maneuver for spacecraft owner operators to validate and negotiate conjunction avoidance.

10. The system of claim 9, further comprising:
Supplemental Data Supplier (SDS) Interface to receive space environment data requests, responses, and notifications.

11. The system of claim 10, wherein two or more of the SSA interface, S3 interface, CAS interface, and the SDS interface are combined into a single interface.

12. The system of claim 10, further comprising:
an STM gateway for relaying and recording messages between the S3, the CAS, and the SDS.

13. The system of claim 9, further comprising:
where one or more objects in a space conjunction are not controlled by an O/O participating in the STM system.

14. The system of claim 9, further comprising:
the S3 further configured to enable negotiations between two of the spacecraft owner operators.

15. The system of claim 9, wherein two or more of the S3, the SSA, and the CAS functions are performed by a single entity.

16. A method of providing a Space Traffic Management (STM) framework comprising:
receiving a registration of an owner operator (O/O) by a System Service Supplier (S3) to participate in the STM system;
sending, by the S3, data about the O/O's spacecraft to a Space Situational Awareness Supplier (SSA);
updating, by the SSA, a catalog of resident space objects (RSO), wherein the SSA further performs the step of generating a meta-catalog by multiparty computation (MPC) that securely shares inputs from a plurality of SSAs for performing computations on position and trajectory, information of resident space objects while shielding the inputs from one or more other interfaces;
sending, by the S3, a request for an encounter screening to a Conjunction Assessment Supplier (CAS), the conjunction assessment supplier to use data from the SSA to return conjunction data message indicating potential conjunctions;
wherein the messages are sent through the STM framework, and an STM gateway routes and stores the messages sent by the S3; SSA, and CAS.

17. The method of claim 16, wherein providing the conjunction data message comprises:
receiving the space conjunction request from the S3 interface,
requesting and receiving the RSO data from the SSA interface; and
generating and sending a conjunction data message to the S3 interface.

18. The method of claim 16, further comprising:
the CAS receiving space environment data from a Supplemental Data Supplier (SDS), the CAS using the space environmental data in the encounter screening.

19. The method of claim 16, wherein the potential conjunctions include:
(1) conjunctions between an RSO of the O/O and another O/O that participates in the STM framework;
(2) conjunctions between the RSO of the O/O and different O/O that does not participate in the STM framework;
(3) conjunctions between the RSO of the O/O and objects that are not controlled.

20. The method of claim 19, further comprising:
generating, by the CAS, a proposed maneuver in response to determining that one of the potential conjunctions requires a maneuver;
receiving, via the S3, the proposed maneuver by the O/o; and
when the proposed maneuver is accepted by the O/O, publishing by the S3 the accepted maneuver to the catalog of the SSA.

* * * * *